E. H. CARROLL.
MACHINE FOR PLANING GEARS.
APPLICATION FILED JULY 27, 1918.

1,436,431.

Patented Nov. 21, 1922.
2 SHEETS—SHEET 2.

Inventor
E. H. Carroll
By Attorney
Geo. H. Kennedy Jr.

Patented Nov. 21, 1922.

1,436,431

UNITED STATES PATENT OFFICE.

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

MACHINE FOR PLANING GEARS.

Application filed July 27, 1918. Serial No. 247,025.

*To all whom it may concern:*

Be it known that I, ELBERT H. CARROLL, a citizen of the United States, residing at Worcester, in the county of Worcester and Commonwealth of Massachusetts, have invented a new and useful Improvement in a Machine for Planing Gears, of which the following, together with the accompanying drawings, is a specification.

The present invention relates to a machine for forming spiral or helical teeth on gear wheels, by the use of a reciprocating cutting or planing tool. The invention resides in a novel combination and arrangement of instrumentalities, associated with the tool moving and work rotating devices of the machine, whereby to render the machine substantially universal in its action, and adapted for the cutting of helical or spiral teeth of any desired angularity or slope on wheels of varying diameters. Other objects and advantages of the invention will be apparent as the description proceeds, reference being had in this connection to the accompanying drawings, wherein Fig. 1 is a plan view of a machine involving the invention.

Fig. 4 is a detail view, partly in section, illustrating the construction of the gearing which is employed for the rotation of the work.

Like reference characters refer to like parts in the different figures.

In the operation of planing or cutting helical teeth on gear wheels, the movement of the cutting tool is reciprocatory, in a straight line, parallel to the axis of the blank from which the gear wheel is formed. Coincident with this straight line movement of the cutting tool, the blank has imparted thereto a rotative movement about its axis, so that the resulting cut on the peripheral surface thereof is helical in form, due to the combined effect of the translatory motion of the tool and the rotary motion of the work. The slope or angularity of the helical cut is obviously dependent upon the degree of rotation imparted to the work during each stroke of the cutting tool; the greater the angular displacement of the work, the sharper will be the incline of the tooth.

A machine of this class must not only meet the requirements for a wide variation in the angularity or slope of the helical teeth, but must also naturally be adaptable for blanks of various sizes, ranging from those of small diameter, with relatively few teeth, such as are used as pinions, to those of large diameter with a great multiplicity of teeth on their peripheral surfaces. It will be seen at the outset that these two requirements have a tendency to complicate the mechanism, and to necessitate the provision therewith of numerous sets of change gears, or the like, in order to render the machine adaptable to the varying conditions of operation. For instance, assuming the machine to be set and adjusted for cutting teeth of a given angle and slope, it will be clear that the moment any work of a different diameter is introduced, the angularity or slope of the cut will at once be changed. In other words, the adjustment for a twenty-five degree cut on a gear three feet in diameter will give an entirely different angle of cut on a gear six feet in diameter, and for every intermediate diameter of work, between the limits of operation of the machine, there will be a variation in the angle of cut. Consequently, in order to provide for the establishment of the multiplicity of speed ratios between tool movement and work rotation that are needed, it would seem, in theory at least, that an infinite number of sets of change gears, or equivalent devices would be required, to cover the varying conditions of work diameter and angularity of cut.

Figure 1:
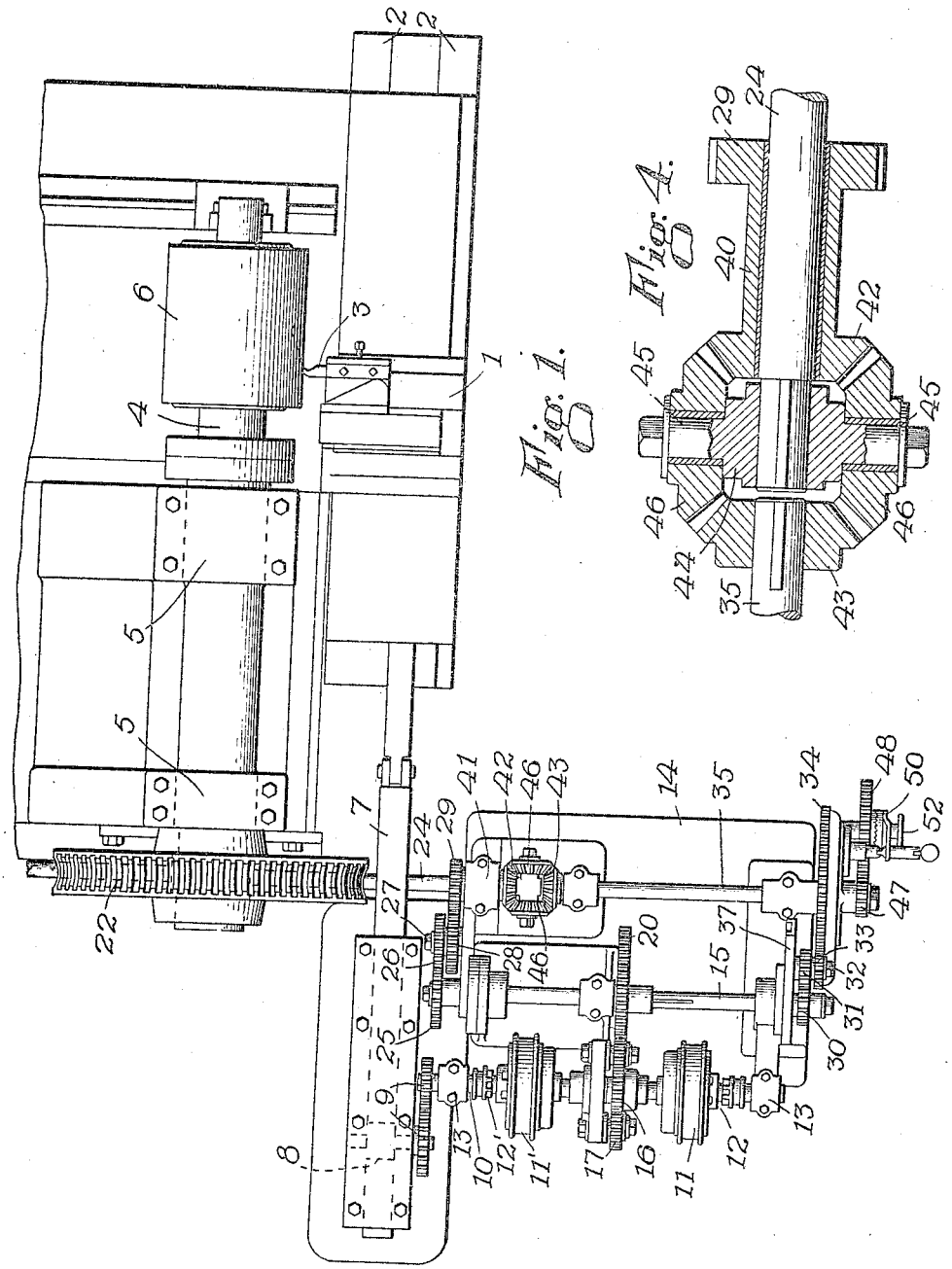

The present invention contemplates the provision of mechanism adapted to simplify the construction of a machine of this class, by the introduction of instrumentalities which are calculated to minimize the number of change speed gears required, and at the same time to increase the accuracy of the machine, both as regards the operations of cutting the teeth and indexing the same preparatory to another cut on the same piece of work. As shown in Fig. 1, the improved mechanism is embodied, for purposes of illustration, in connection with planing or shaping devices of any well known type, the same being here shown as consisting of a reciprocatory tool slide 1, adapted to travel in ways 2, 2, and carrying a cutting or planing tool 3. The latter, as is usual in machines of this class, is made adjustable toward and away from the work carrying device, which is here shown as a mandrel or the like 4, suitably journalled in bearings 5, 5, and serving for the support of a gear blank 6. The above described adjustment of the cutting tool adapts the machine for operation on various sizes of gear blanks, as will be readily understood, and it will be seen that when rotation is imparted to the mandrel 4, simultaneously with the cutting movement of the tool 3, the resulting cut on the surface of the gear blank will be helical or spiral in contour, depending upon whether the blank is cylindrical or conical in form.

The reciprocatory tool slide 1 is connected to a sliding rack 7, the latter being actuated back and forth by a pinion 8, shown in dotted lines on Fig. 1. Rotation is imparted to the pinion 8 through a train of gears 9, 9 which are driven from a shaft 10. The shaft 10, constituting the main actuating shaft of the machine, and from which both the movement of the tool and the rotation of the work are derived, carries loosely thereon a pair of drive pulleys 11, 11′, which are connected respectively with a constantly rotating source of power by a straight belt and a crossed belt, not shown, so that said pulleys rotate in opposite directions. Associated with the pulleys 11, 11′ are clutching devices 12 and 12′ respectively, adapted to connect them alternately with the shaft 10, these clutching devices being thrown into and out of operation by a suitable reversing gear, such as is commonly provided in machines of this class, and which is not herein shown since it forms no part of the present invention. It is sufficient to state that any well known instrumentalities for this purpose may be used, to cause rotation of the shaft 10 first in one direction and then in the other, so as to reciprocate the tool slide 1 back and forth to give first a cutting stroke to the tool 3 and then a return of said tool to the position for the commencement of another cut.

The shaft 10 is carried in suitable bearings 13, 13 of a supporting framework 14, and the latter also provides journals for a parallel shaft 15, adapted to be driven from the shaft 10. To this end, the shaft 10 carries a gear 16 which runs in mesh with an idle gear 17 carried by a stationary bracket 18. The idle gear 17 in turn meshes with a second idle gear 19 which is removably journalled in said bracket, as shown in Fig. 3, so as to mesh with a gear 20 fast on shaft 15. In the position of the gear 19 illustrated in Fig. 3, the rotation of shaft 15 will be in the opposite direction to the rotation of shaft 10, and this will produce, as hereinafter described, a rotation of the mandrel 4 in a proper direction to cause the cutting of a tooth, either right or left hand, on the gear blank 6. The bracket 18 provides, as shown in Fig. 3, a bearing 21, adapted, when desired, to accommodate the journals of gear 19, so as to mesh the teeth of this gear directly with the teeth of gears 16 and 20; in this position of the gear 19, (Fig. 2) the direction of rotation of shaft 15 will be the same as that of shaft 10, and as a consequence the angle of cut on the gear blank 6 will be opposite to that occurring when the gear 19 is in its first described position.

The shaft 15, rotating in unison with the shaft 10, is employed for the purpose of setting up rotation of the mandrel 4, and to this end said mandrel carries a worm gear 22 which is actuated by a worm, not shown, on a shaft 24, the latter being operatively connected to the shaft 15 by a mechanism of special construction and principle of operation, as hereinafter described. The operative connection of the shafts 15 and 24 by a train of suitably selected reducing gears would obviously establish the necessary relation between tool movement and work rotation for a single phase of operation of the machine, under given conditions of work diameter and angularity of cut. But, as heretofore pointed out, it is not only impracticable to provide the infinite number of sets of change gears necessary to take care of all the varying conditions met with in the operation of the machine, but it is also impossible, as a matter of practical construction and operation, to obtain, by the mere use of a train of reducing gears, the necessary accuracy and range of adjustment in the speed of shaft 24. In other words, for every different condition of operation of the machine, as determined by work diameter and angularity of cut, there will be a different fixed and predetermined speed for the shaft 24; in the nature of things, it would not be possible to obtain each one of these infinite variations in speed, accurately, from the fixed speed shaft 15, by ordinary sets of change speed gears.

The present invention comprehends a novel expedient in this connection by the employment of two or more sets of change speed gears operating in conjunction between the fixed speed shaft 15 and the variable speed shaft 24. In the present instance two such gear reduction trains are shown, one, consisting of a gear 25 on shaft 15 in mesh with a gear 26 on a stub shaft 27, the latter carrying a gear 28 which meshes with a gear 29 running loosely on the shaft 24. The other of said gear reduction trains comprises a gear 30 on the opposite end of shaft 15, which meshes with a gear 31 on shaft 32, said shaft also carrying a pinion 33 adapted to mesh with a gear 34 running loose on a shaft 35. It is to be understood, of course, that the gears 25, 26 and 30, 31 and 33 are adapted for removal, and for replacement by various other size gears adapted to establish different speed ratios, and to this end, as shown in Fig. 3, the short shaft 32 is mounted for adjustment in a slot 36 of a bracket 37, the latter being itself adjustably secured to the frame of the machine by bolts 38 passing through elongated curved slots 39, so as to permit swinging movement of said bracket about the axis of shaft 15. It will thus be seen that the gear 29 and also the gear 34, both deriving rotation from the fixed speed shaft 15, are both capable of a variety of speed changes within the limits of the adjustments provided by the respective sets of change gears that connect them to said shaft 15.

The gear 29, as shown in Fig. 4, is integral with a quill or collar 40 which loosely surrounds the shaft 24, and is itself journalled in a bearing 41. On the other side of said bearing the quill 40 provides an integral bevel gear 42 which is spaced from and in axial alinement with an oppositely facing bevel gear 43 secured on the end of shaft 35. The shaft 24, passing loosely through the quill 40, terminates, in the space between the bevel gears 42 and 43, in a head 44 which provides a pair of transverse trunnions 45, 45 on which are journalled bevel gears 46, 46 at right angles to the gears 42 and 43 and meshing therewith. The other end of shaft 35, passing through the hub of gear 34, carries a pinion 47, which meshes with a gear 48 that is carried on a shaft 49 projecting outwardly, in an eccentric position, from the gear 34. Said shaft 49 carries an arm 50 which is normally held rigid with the gear 48 by a spring 50$^a$, which retains the cooperating serrations 51, Fig. 2, in engagement; the pressure of said spring can be temporarily withdrawn by pulling outwardly on a handle 52, thereby to permit angular adjustment between the arm 50 and the gear 48. The free end of said arm 50 is adapted to be engaged with a projection 53 on the rim of gear 34, by means of a spring pressed locking member 54 which is received in a recess at the end of the projection 53. When said locking member 54 is withdrawn by the retraction of a handle 55, the arm 50 and gear 34 become disengaged, thus permitting rotation of gear 48 by said arm.

Figure 2:
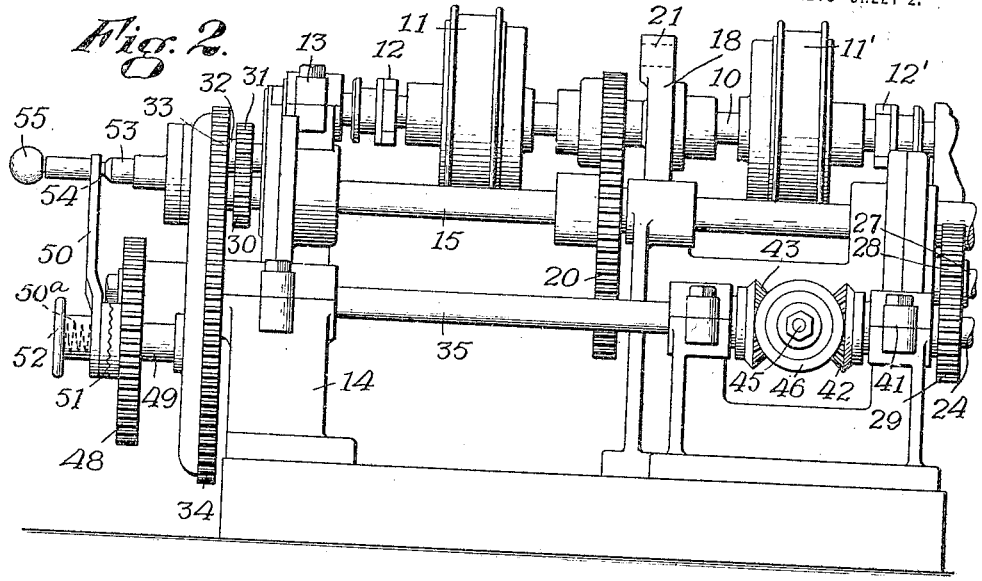
Fig. 2 is a side elevation of a portion of the gearing shown in Fig. 1.
Figure 3:
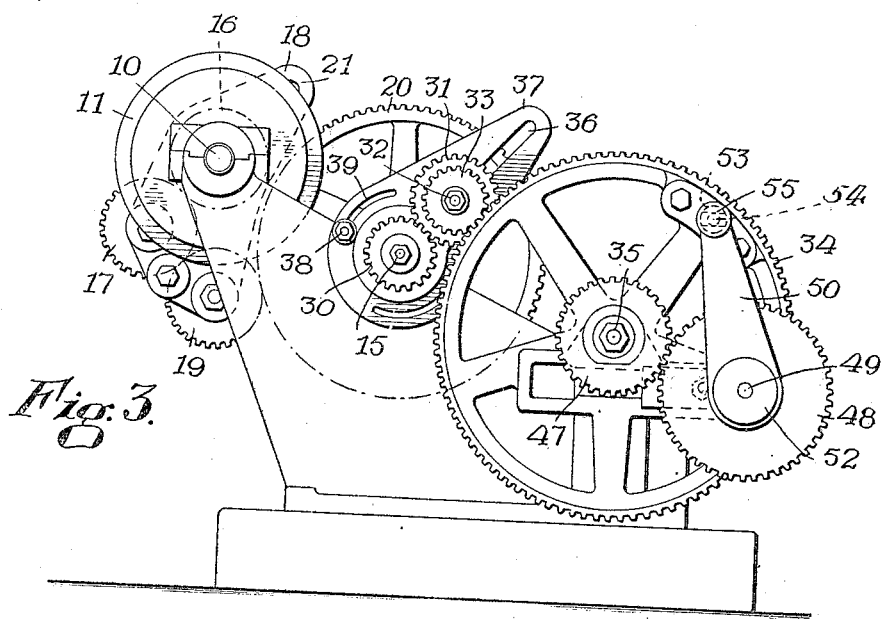
Fig. 3 is an end elevation of that portion of the machine which includes said gearing.

When, however, the locking member 54 is in its operative position, as shown in Fig. 2, the above described mechanism constitutes in effect a clutch between the gear 34 and the shaft 35, so as to constrain the rotation of these two parts in unison. It will thus be seen that the bevel gears 42 and 43 will each be rotated, independently, from the fixed speed shaft 15, the speed of each bevel gear being contingent upon the respective change speed reduction gearing to which it is connected. As a result of the rotation of the two bevel gears 42 and 43, there will be produced a rotation of the shaft 24, by the differential movement of the bevel gears 46, 46. The speed of shaft 24 is a function of the combined speeds of the gears 42 and 43, as will be recognized by those conversant with so-called differential gear sets; in the present instance, assuming the gears of the differential to be of the same size, the speed of the shaft 24 will be one-half of the sum of the speeds of gears 42 and 43.

As a consequence of this relation, produced by the introduction of the above described gearing, the speed of shaft 24 is made dependent upon a plurality of variable factors instead of upon a single variable factor, as would be the case if an ordinary change speed gear reduction were employed. In other words, it is possible with the gearing described above, to obtain a much closer and more exact regulation of the speed of shaft 24 than if an ordinary set of change speed gears were used. The transmission of rotation to shaft 24 comes through the set of change speed gears 25, 26 and also through the set of change speed gears 30, 31 and 32; these sets are independently variable, and a variation in either one or both of them will produce a variation in the speed of shaft 24.

The mechanism above described lends itself readily to the indexing of the work, preparatory to the commencement of the cut for another tooth. To effect this result, the handle 55 is retracted, thereby destroying the clutch connection between the shaft 35 and the gear 34. This permits the arm 50 to be rotated, so as to rotate the gear 48 which, through the gear 47, rotates the shaft 35. During this operation, there is no rotation transmitted to the shaft 15 and, consequently, no rotation transmitted to the gear 29. The differential gear, therefore, is actuated solely by the bevel gear 43, so that the rotation of shaft 24 in the act of indexing is equal, under the conditions assumed, to one-half the rotation of shaft 35. This brings the work into the desired position for the commencement of another cut by the tool 3 without changing any of the other relations that have been previously calculated and established for the size of the work and the angularity of the cut, it being understood that the serrations 51 permit any required relative movement, in the usual way, to obtain the maximum of accuracy in indexing. After the indexing operation is completed, the arm 50 is again secured to the gear 34 by the locking device 54, whereupon the machine is ready to be started for the operation of cutting another tooth.

The recess at the end of the projection 53 is in the form of a slot extending across the projection, as indicated in Fig. 3, so that the locking member 54 may be readily received therein even though the locking member does not always occupy the same position with respect to the projection 53, when the respective sets of serrations 51 are in engagement.

The general operation of the machine is as follows:—The blank 6 having been positioned on the mandrel 4, the tool 3 is adjusted for the diameter of the blank and the respective trains of gears between the gears 29 and 34 and the shaft 15 are so arranged that the shaft 24 will be driven at the proper speed to obtain the desired angularity of cut on the blank 6. The machine is then started by operating one of the clutching devices 12, so that the tool 3 is moved across the blank 6 while the latter is turned on its axis, the combined movements of the tool and the blank resulting in a helical groove being formed in the blank. The tool 3 continues to reciprocate on the ways 2, at the same time being advanced toward the blank until a tooth is completely cut. The operation of the machine is then interrupted and the blank 6 is brought into position for the commencement of another cut by the indexing devices, as described above.

While I have shown my invention as applied to a particular arrangement of the parts of a gear cutting machine, it is not so limited, but may be applied to any gear cutting machine in which it is desired to move the work carrier relatively to the cutting tool during the cutting operation. I desire therefore that only such limitations be imposed thereon as come within the scope of the appended claims.

I claim,

1. In a machine of the class described, the combination with a rotating actuating member for a reciprocating cutting device and a simultaneously operating work rotating device, of a plurality of sets of change gears connected with said actuating member, and means for transmitting the combined effect of said sets to said work rotating device.

2. In a machine of the class described, the combination with a rotating actuating member for a reciprocating cutting device and a simultaneously operating work rotating device, of a plurality of rotating elements each connected independently, by gearing, to said actuating member, and means for combining the rotation of said elements to cause rotation of said work rotating device.

3. In a machine of the class described, the combination with a rotating actuating member for a reciprocating cutting device and a simultaneously operating work rotating device, of a plurality of rotating elements each connected independently, by gearing, with said actuating member, means for varying the speed of said elements, and means for combining the rotation of said elements to cause rotation of said work rotating device.

4. In a machine of the class described, the combination with a rotating actuating member for a reciprocating cutting device and a simultaneously operating work rotating device, of a plurality of rotating elements each connected independently, by gearing, with said actuating member, means for varying the speed of said elements, and gearing, operated upon in unison by all of said rotating elements, for transmitting the combined rotation thereof to said work rotating device.

5. In a machine of the class described, the combination with a rotating actuating member for a reciprocating cutting device and a simultaneously operating work rotating device, of a plurality of rotating elements each connected independently, by gearing, with said actuating member, means for varying the speed of said elements, and means, operated upon differentially by each of said rotating elements for transmitting the combined rotation thereof to said work rotating device.

6. In a machine of the class described, the combination with a rotating actuating member for a reciprocating cutting device and a simultaneously operating work rotating device, of a plurality of rotating elements each connected independently, by gearing, to said actuating member, means for combining the rotation of said elements to cause rotation of said work rotating device, and means for rotating one of said elements independently of the others.

7. In a machine of the class described, the combination with a rotating actuating member for a reciprocating cutting device and a simultaneously operating work rotating device, of a plurality of rotating elements each connected independently, by gearing, with said actuating member, means for varying the speed of said elements, gearing, operated upon in unison by all of said rotating elements, for transmitting the combined rotation thereof to said work rotating device, and means for actuating said gearing by the independent rotation of one of said elements.

8. In a machine of the class described, the combination with a reciprocating cutting device and a simultaneously operating work rotating device, of a rotating actuating member for said cutting device, a plurality of sets of change gears driven from said actuating member, and means for differentially transmitting the drive of said change gears to said work rotating device.

9. In a machine for forming gear teeth, the combination with a work actuating shaft, a driving shaft for actuating a cutting device and a plurality of rotating elements connected to said driving shaft, of means for connecting the said rotating elements to said work actuating shaft, whereby the speed of rotation of said work actuating shaft is a function of the combined speeds of the rotating elements.

10. In a machine for forming gear teeth, the combination with a rotating shaft for driving a cutting device, a work carrier and a shaft for actuating said work carrier, of a plurality of rotating elements driven from said rotating shaft, and so connected to said work carrier shaft that the speed of rotation of said work carrier shaft is a function of the combined speeds of the rotating elements.

11. In a machine for forming gear teeth, the combination with a rotating shaft for driving a cutting device, a work carrier and a shaft for actuating said work carrier, of a plurality of rotating elements driven from said rotating shaft by independent gearing, and means for combining the rotation of said elements to cause rotation of said work carrier shaft.

12. In a machine for forming gear teeth, the combination with a rotating shaft for driving a cutting device, a work carrier and a shaft for actuating said work carrier, of a plurality of rotating elements driven from said rotating shaft by independent gearing, and other gearing operated upon in unison by all of said rotating elements for transmitting the combined rotation thereof to said work carrier shaft.

13. In a machine for forming gear teeth, the combination with a rotating shaft for driving a cutting device, a work carrier and a shaft for actuating said work carrier, of a plurality of rotating elements driven from said rotating shaft, and differential gearing operated upon by said rotating elements for transmitting the combined rotation thereof to said work carrier shaft.

14. In a machine for forming gear teeth, the combination with a rotating shaft for driving a cutting device, a work carrier and a shaft for actuating said work carrier, of a plurality of sets of change gears driven from said rotating shaft, and means for differentially transmitting the drive of said change gears to said work carrier shaft.

Dated this 19th day of July, 1918.

ELBERT H. CARROLL.

Witnesses:
 THEODORE H. NYE,
 EDWARD J. QUINN.